United States Patent [19]
Cairns

[11] Patent Number: 5,722,842
[45] Date of Patent: Mar. 3, 1998

[54] UNDERWATER-MATEABLE CONNECTOR FOR HIGH PRESSURE APPLICATIONS

[75] Inventor: James L. Cairns, Ormond Beach, Fla.

[73] Assignee: Ocean Design, Inc., Ormond Beach, Fla.

[21] Appl. No.: 811,545

[22] Filed: Mar. 4, 1997

Related U.S. Application Data

[62] Division of Ser. No. 375,957, Jan. 20, 1995, Pat. No. 5,645,438.

[51] Int. Cl.⁶ ............................................. H01R 13/44
[52] U.S. Cl. ................................. 439/139; 439/201
[58] Field of Search .............................. 439/139, 143, 439/145, 201, 205, 199

[56] References Cited

U.S. PATENT DOCUMENTS

| | | | |
|---|---|---|---|
| 3,508,188 | 4/1970 | Buck | 339/42 |
| 3,593,415 | 7/1971 | Wofford | 29/628 |
| 4,203,640 | 5/1980 | Bice et al. | 439/439 |
| 4,411,491 | 10/1983 | Larkin et al. | 350/96.21 |
| 4,673,242 | 6/1987 | Logan et al. | 350/96.2 |
| 4,682,848 | 7/1987 | Cairns et al. | 350/96.21 |
| 4,753,611 | 6/1988 | Kobler | 439/578 |
| 4,767,349 | 8/1988 | Pottier et al. | 439/191 |
| 4,865,563 | 9/1989 | Ney et al. | 439/404 |
| 4,929,184 | 5/1990 | Emadi et al. | 439/681 |
| 4,948,377 | 8/1990 | Cairns | 439/200 |
| 5,194,012 | 3/1993 | Cairns | 439/201 |
| 5,217,391 | 6/1993 | Fisher, Jr. | 439/578 |
| 5,358,418 | 10/1994 | Carmichael | 439/700 |

FOREIGN PATENT DOCUMENTS

| | | |
|---|---|---|
| 141746 | 5/1985 | European Pat. Off. . |
| 538089 | 4/1993 | European Pat. Off. . |
| 2166261 | 4/1986 | United Kingdom . |

*Primary Examiner*—Gary F. Paumen
*Attorney, Agent, or Firm*—Brown, Martin, Haller & McClain, L.L.P.

[57] ABSTRACT

A connector sealing mechanism for, and a method for mating a plug unit and receptacle unit of, an electrical, fiber-optic, or hybrid electro-optical connector unit. The connector unit and connector sealing mechanism are adapted for use in underwater and harsh environments, such as high pressure environments. The connector sealing mechanism is used to open and close a passage through the connector unit, the sealing mechanism having an open position and a closed position. The sealing mechanism includes a moveable gate body that is moveable in a lateral, as opposed to axial, direction within the connector unit. The gate body has a bore hole that is substantially aligned with the passage in the connector unit when in the open position. The sealing mechanism also has a gate key for moving the gate body laterally within the connector unit from the open position to the closed position. In the method, a plug unit having at least one keyway and at least one key (or tab) is mated to a receptacle unit having at least one key (or tab). The plug and receptacle units are forced together and rotated at certain points in order to move the keys through the keyways and thereby mate the two units.

10 Claims, 12 Drawing Sheets

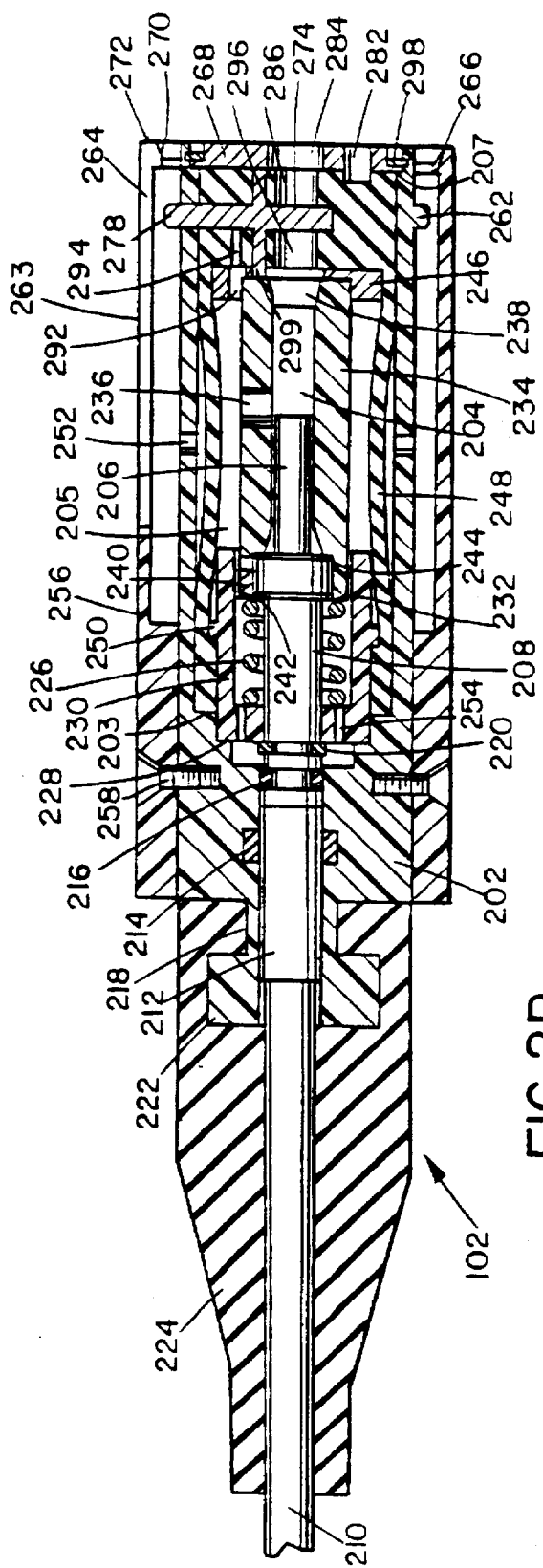
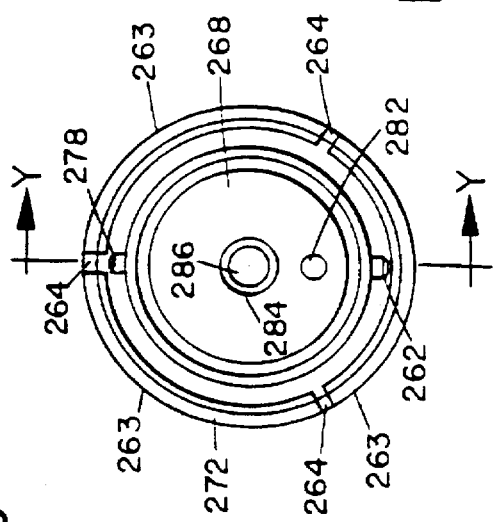
FIG. 2B
FIG. 2A

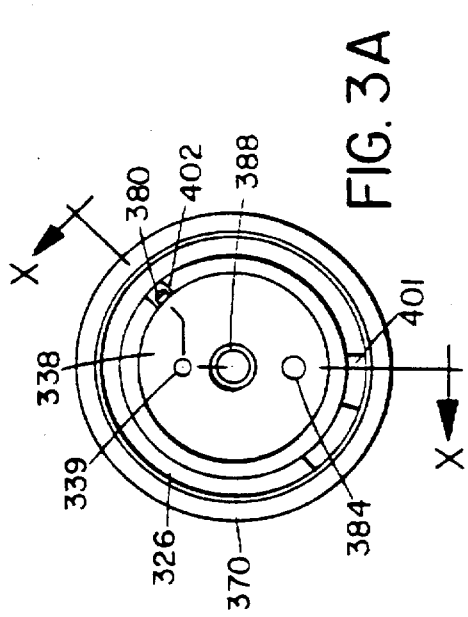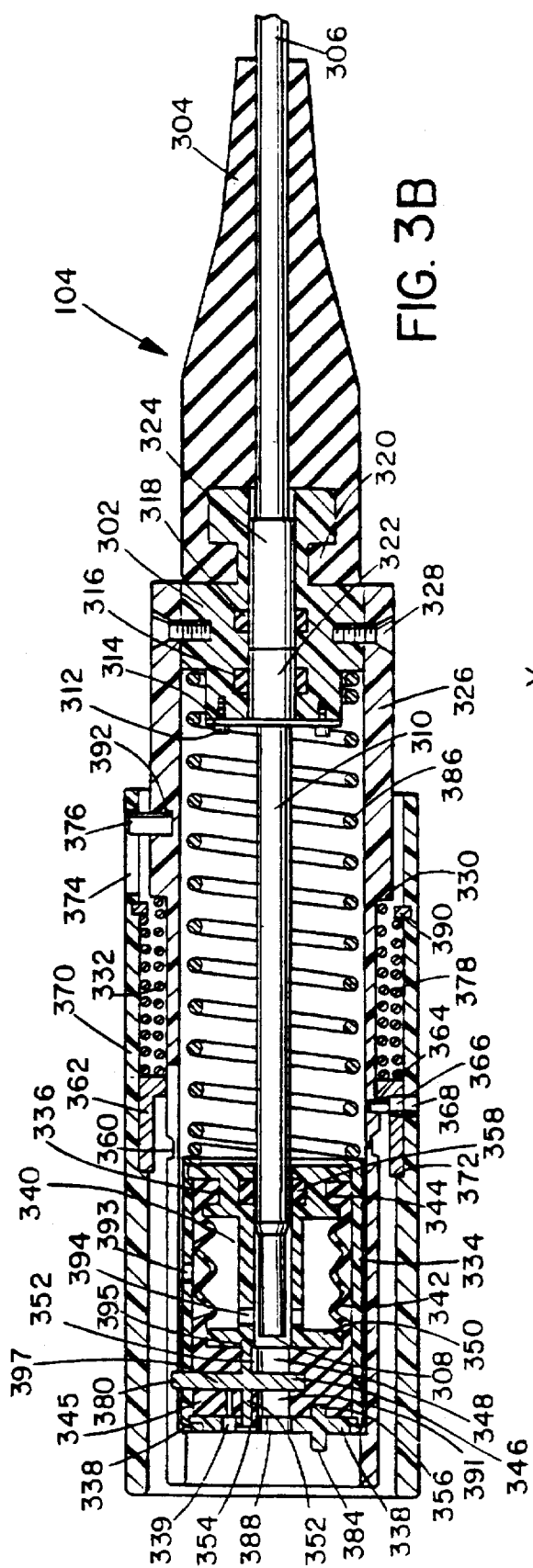

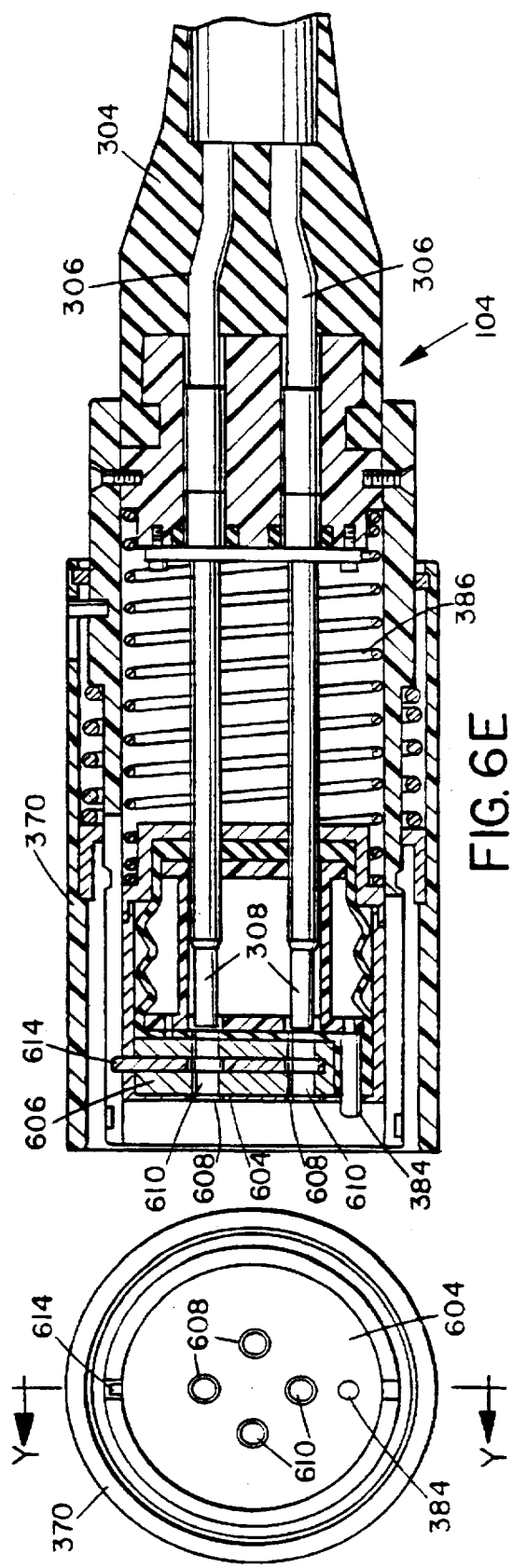
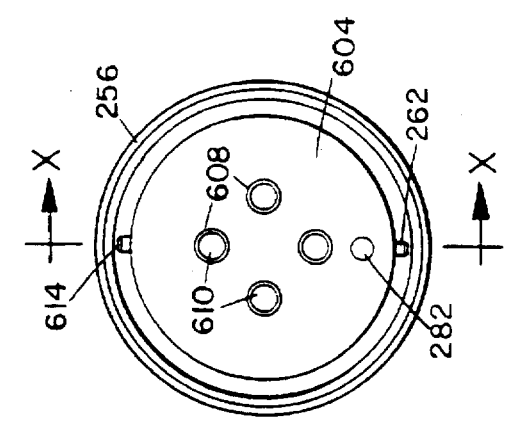
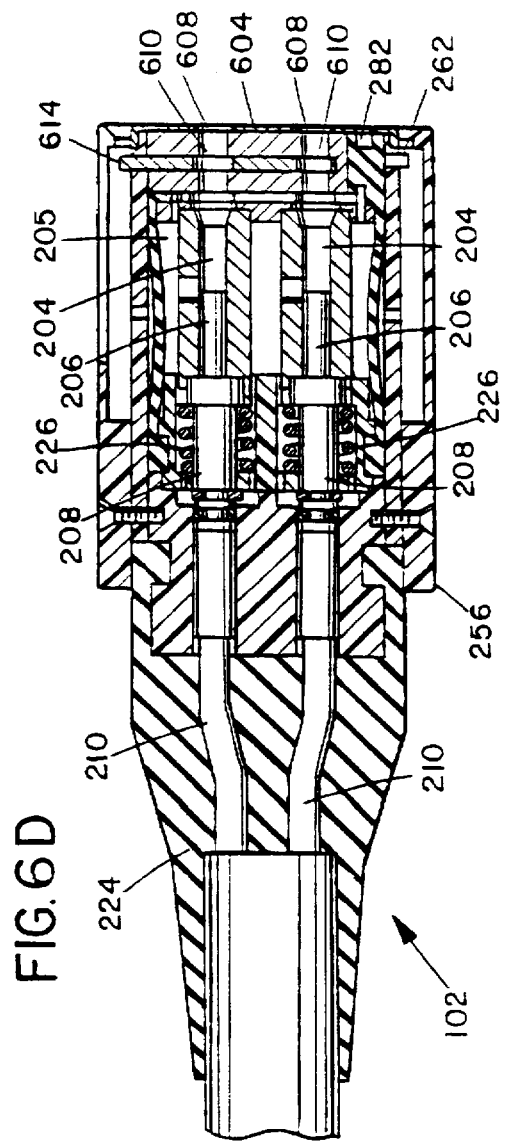
FIG. 6E
FIG. 6F
FIG. 6D
FIG. 6G

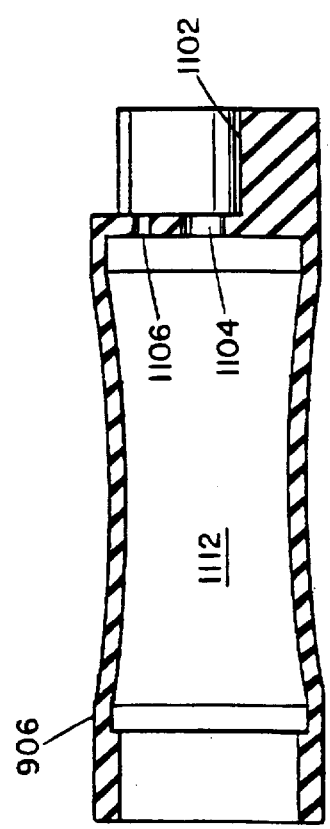
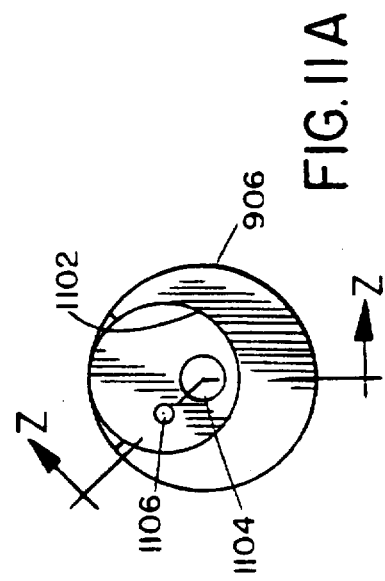
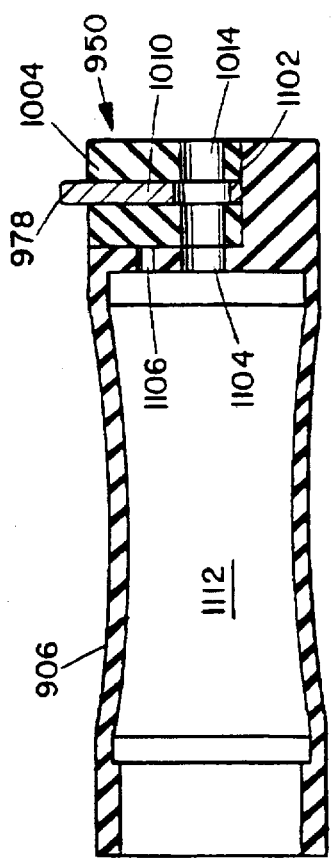
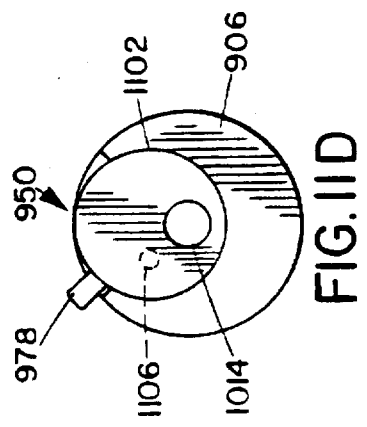
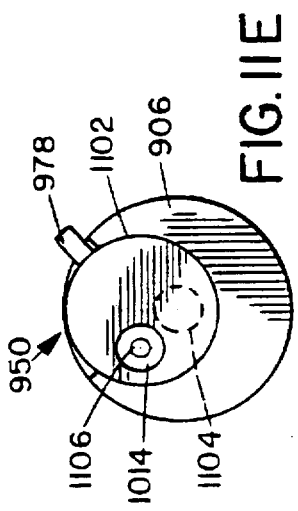

UNDERWATER-MATEABLE CONNECTOR FOR HIGH PRESSURE APPLICATIONS

This is a divisional of application Ser. No. 08/375,957, filed Jan. 20, 1995, now U.S. Pat. No. 5,645,438 issued Jul. 8, 1997.

BACKGROUND OF THE INVENTION

1. Field of the Invention

The present invention relates to the field of underwater and harsh environment electrical and fiber-optic connectors. More particularly, the present invention relates to underwater-mateable connectors suitable for high pressure applications.

2. Description of Related Art

An ever increasing need exists for electrical, fiber-optic, and hybrid electro-optical connectors that can be used in hostile environments. Further, a need often exists for such connectors that can be installed in the field and mated/demated repeatedly underwater. As a result, conventional electrical and optical connectors have been developed that can be thus employed, examples of which are found in U.S. Pat. Nos. 4,682,848; 4,441,491; 4,948,377; and 5,194,012.

While the connectors exemplified by these patents do provide interconnection means suitable for harsh environments and that can be cycled underwater, they have many shortcomings. The connectors of the above cited patents employ fluid-filled and pressure-balanced construction, which is a desirable feature. Yet the key to successful operation of connectors of the fluid-filled type is employing the sealing means to keep the fill-fluid in the connector and to keep the outside environment from contaminating the interior of the connector.

Conventional sealing mechanisms exist for accomplishing these functions. One class of such electrical connectors employs an assembly of springs and stoppers to seal the entrance to the mating area of the connectors. While these are successful for electrical connectors, they are not easily adapted to accommodate the connection of optical circuits. Moreover, they are relatively complicated and expensive in both electrical and optical applications.

Another sealing mechanism has an opening into the mating chamber consisting of an elastomeric tubular entrance surrounded by an elastomeric sphincter that pinches the entrance closed either upon itself, in the unmated condition, or against an entering probe, in the mated condition. This has been used with some success for both electrical and optical connectors, but is far from a complete solution to the problem. One drawback is that seals of this sort do not work well in all conditions. Another disadvantage of is that after being mated for a prolonged period of time, such seals lose their "memory," failing to close quickly, and thereby exposing the interior of the chamber to the outside environment.

Still another category of wet-mateable optical connectors uses a simple slit in an elastomeric barrier into the mating chamber of the connector to separate the interior of the chamber from the exterior environment. These connectors rely on the elastic properties of the barrier to seal the connector before, during, and after penetration of the mating probe. They do not work well, however, due to the fact that the seal does not close upon itself reliably. Fill fluid leaks out, and the outside fluid leaks in.

All of the known schemes for providing repeatable, reliable optical connections in hostile environments, therefore, are only marginally effective. The optical connectors presently available are extremely expensive and generally require complicated means for terminating the connector elements to the optical or electrical cables they are intended to eventually connect. While the reliability of electrical connectors is better, the most successful electrical connectors, those employing springs and stoppers for their seal, are complicated, expensive, and not easily adaptable for fiber-optic connections.

Therefore, a need exists for a simple, inexpensive, and effective connector for repeatedly and reliably making either electrical, optical, or hybrid electro-optical connections in hostile environments. Such environments include sea water and high pressure zones, such as the greatest ocean depths.

SUMMARY OF THE INVENTION

Accordingly, the present invention is directed to a reliable, inexpensive and versatile connector for making cyclable connections of low-loss optical fibers, electrical conductors, or hybrid electro-optical circuits. The present invention is also directed to providing such a connector that may be used underwater or in other harsh environments; that may be mated and demated underwater, even when exposed to the pressures of the greatest ocean depths; and that can be easily terminated to the cable-ends in the field.

Additional features and advantages of the invention will be set forth in the description that follows, and in part will be apparent from the description, or may be learned by practice of the invention. The objectives and other advantages of the invention will be realized and attained by the apparatus and method particularly pointed out in the written description and claims of this application, as well as the appended drawings.

To achieve these and other objectives and advantages of the invention, and in accordance with the purpose of the invention as embodied and broadly described herein, the invention is a connector sealing mechanism for opening and closing a passage through a connector unit, the sealing mechanism having an open position and a closed position. The mechanism comprises a moveable gate body including a gate bore, the gate bore being substantially aligned with the passage in the open position. The gate body is moveable in a lateral direction within the connector. The mechanism also comprises a device, such as gate key, that moves the moveable gate body in the lateral direction from the open position to the closed position and from the closed position to the open position.

In another aspect, the present invention is a plug/receptacle type of interconnection that may be used for electrical, optical, or hybrid electro-optical connections in hostile environments. This discussion will proceed with the description of the invention when employed as a simple connector utilized to connect two standard, jacketed and reinforced optical fiber cables. It will be obvious in the course of the discussion that the invention can be used equally well to affect connections of simple electrical conductors, coaxial electrical conductors, and hybrid electrical/optical conductors.

In providing electrical connections, the invention is also capable of providing two or dual elastomer end seals, and also with an intervening chamber of dielectric fluid.

The plug/receptacle interconnection of the present invention comprises a connector including two units, a receptacle and plug. Both the receptacle and plug units have a cable end and a connection end, as well as a chamber, a base, and a sealable opening at the connection end. The units have an axial passage through the base; they also have a seal gate, such as the connector sealing mechanism described above, which is disposed within the sealable opening. The connection ends are terminated to the conductors that are to be connected by the connector. The terminations of the conductors, when made to cables of standard construction, are affected in the field by commonly employed means.

In each unit, the elements to be joined are enclosed in the chamber, which is a sealed fluid-filled cavity, pressure balanced to the outside environment. In the optical connector, the fluid is optically compatible with the efficient passage of light (and is a dielectric when electrical circuits are employed). Moreover, the fluid is non-corrosive to both metal and optical fibers. The fluid chambers can volumetrically compensate for changes in geometry that occur during the mating/demating process. Both chambers have penetrable fluid tight sealing mechanisms to allow the passage of the conductive elements during mating and demating actions.

In the receptacle unit, the receptacle is intended to receive the mating plug. In the case of optical connections, the receptacle serves as a mechanism that keeps the optical mating interface axially aligned. In optical connections, it is also important to prevent excessive compression between the faces of the mating optical elements. The present invention provides a spring mounting for the receptacle that controls the force between these mating faces. In the configuration now discussed, the mating elements are standard straight terminal ("ST") components, and the receptacle consists of one such component housed in an alignment ferrule that directs the ST component of the plug into mating alignment. The units are most easily visualized as cylindrical elements disposed on a common axis. The receptacle unit containing the receptacle within its fluid-filled chamber is penetrated on the cable end by the conductor cable to be connected and on the connector end, i.e., the end facing the plug, by a sealed opening allowing penetration of the plug.

The plug itself is contained within the plug unit. The plug includes an elongated probe whose connective portion is sealably enclosed within a fluid-filled chamber. The chamber is free to slide on the probe axially in such a way that it encloses the vulnerable tip of the probe in the unmated condition, but slides back to allow the tip to exit through a sealable passage during the mating sequence. This second unit is penetrated on the cable end by the other cable to be connected, and on the connector end, i.e., the end facing the receptacle, by the sealable opening.

The connector may have tubular elements or housings that protect the elements within the plug and receptacle units, while serving to provide guides to facilitate smooth engagement of the units. The connector also has a latching mechanism that serves to keep the two connecting elements engaged until purposely delatched. The tubular elements also serve to activate the opening and closing of the gates in the sealable openings, which gates open and close the fluid-filled chambers of the units.

In yet another aspect, the present invention is a method for mating the plug unit to the receptacle unit. The units each have a mating face. As the units are mated, forcing the units (and particularly the tubular elements) together causes the mating faces of the units to meet. By subsequently pushing while turning, similar to the action required to mate a standard "BNC" type connector, the elongated probe of the plug unit enters its end gate. Rotating the units causes the passage in the plug unit to become aligned with the bore through the gate, thereby opening the gate and allowing the probe to advance into the end gate of the receptacle. Further pushing and rotation causes the receptacle gate to open, allowing the probe to pass into the fluid-filled chamber of the receptacle. As the mating sequence is thus completed, the fingers (or inward projections) of a collet type latch then drop into place into detents, retaining the units in complete engagement.

The demating sequence is the reverse of the mating sequence described above. An axial pull on the exterior tubular element of the plug trips the latch, allowing the units to separate. And as the plug is withdrawn from the receptacle unit and rotated at the appropriate points, the receptacle and plug gates close.

There are many possible embodiments of the connector described above. In one such embodiment, one or the other or both the plug and receptacle units may be provided as a fixed element to be mounted to a structure, possibly eliminating the need for a self-contained latching mechanism. In another embodiment the plug portion of the connector may not have a fluid-filled chamber at all, but instead be exposed in the unmated condition to the outside environment, perhaps protected as necessary by a simple removable cover. In still another embodiment, multiple units, such as just described, may be ganged in parallel to affect numerous connections simultaneously.

As the following description is read in conjunction with the described drawings, it will become evident that the connector of the present invention accomplishes the stated goals and provides numerous advantages other than those stated herein.

It is to be understood that both the foregoing general description and the following detailed description are exemplary and explanatory only and are not restrictive of the invention, as claimed.

The accompanying drawings are included to provide a further understanding of the invention and are incorporated in and constitute a part of this specification, to illustrate the embodiments of the invention, and, together with the description, to explain the principles of the invention.

BRIEF DESCRIPTION OF THE DRAWINGS

FIG. 2A is a mating face view illustrating a receptacle unit of the first embodiment of the connector of the present invention.

FIG. 2B is a cut-away view taken along the Y—Y section of FIG. 2A illustrating the receptacle unit of the first embodiment of the connector of the present invention.

FIG. 3A is a mating face view illustrating a plug unit of the first embodiment of the connector of the present invention.

FIG. 3B is a cut-away view taken along the X—X section of FIG. 3A illustrating the plug unit of the first embodiment of the connector of the present invention.

FIG. 6D is a cut-away view illustrating a rotating seal, multi-circuit embodiment of the plug of the present invention.

FIG. 6E is a mating face view of the multi-circuit plug embodiment illustrated in FIG. 6D.

FIG. 6F is a cut-away view illustrating a rotating seal, multi-circuit embodiment of the receptacle of the present invention.

FIG. 6G is a mating face view of the multi-circuit receptacle illustrated in FIG. 6F.

FIGS. 11A–11B illustrate axial and cross-sectional views, respectively, of a seat for a gate assembly, the seat being formed in a compensation bladder/seal, and FIG. 11B taken along line Z—Z of FIG. 11A.

FIG. 11C is a cross-sectional view taken along line Z—Z of FIG. 11 A, illustrating a gate assembly (or connector sealing mechanism) received in the seat of FIGS. 11A–11B.

FIGS. 11D–11E are axial views of the gate/seal mechanism of FIGS. 11A–11C, FIG. 11D illustrating the gate in the open position, and FIG. 11E illustrating the closed position.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

For the remainder of this description, the term "optical fiber" is used to designate an elongated element constructed from material that permits the efficient transmission of light. Reference will also be made in this description to "male" and "female" as well as to "plug" and "socket," or "receptacle" elements of the connectors. For the remainder of this description, the common conventional terminology will be used, in which the terms "plug" and "male" refer to the connector unit incorporating the elongated probe element, and the terms "socket," "receptacle," and "female" refer to the connector element incorporating the mating socket. While the connector of the present invention includes mateable units that can be characterized in these terms, it is to be understood that this nomenclature is only for purposes of understanding the following description; in fact, generically, the units are simply "connector" units.

Reference will also be made to "oil" or "fill-fluid" within the connector units. These terms are used to facilitate understanding of the following description of the connector of the present invention. Nevertheless, it is to be understood that these terms refer to any mobile substance which has the required electrical or optical material properties.

In accordance with the present invention, an apparatus and method are provided for underwater-mateable connectors suitable for high pressure applications. The apparatus includes a receptacle unit and a plug unit. Both the receptacle and plug units have a cable end and a connection end, the cable end being coupled to a conductive element, such as an fiber optic cable, and the connection end having a mating face that engages the mating face of the opposing unit; i.e., the plug mating face engages the receptacle mating face. Both the receptacle and plug units also have a passage through which a probe in the plug may pass, and one or the other or both may have a sealable opening proximate the connection end. The sealable opening receives a gate having a gate bore through it, the gate having open and closed positions. The gate rotates within its respective unit, such that in the open position, the passage is substantially aligned with the gate bore, and in the closed position, the passage is sealed off from the outside environment.

In both disclosed embodiments of the present invention, the rotating gate design provides two fluid tight seals for both the plug and receptacle, with an independent oil bath separating each pair of seals.

Figure 1:
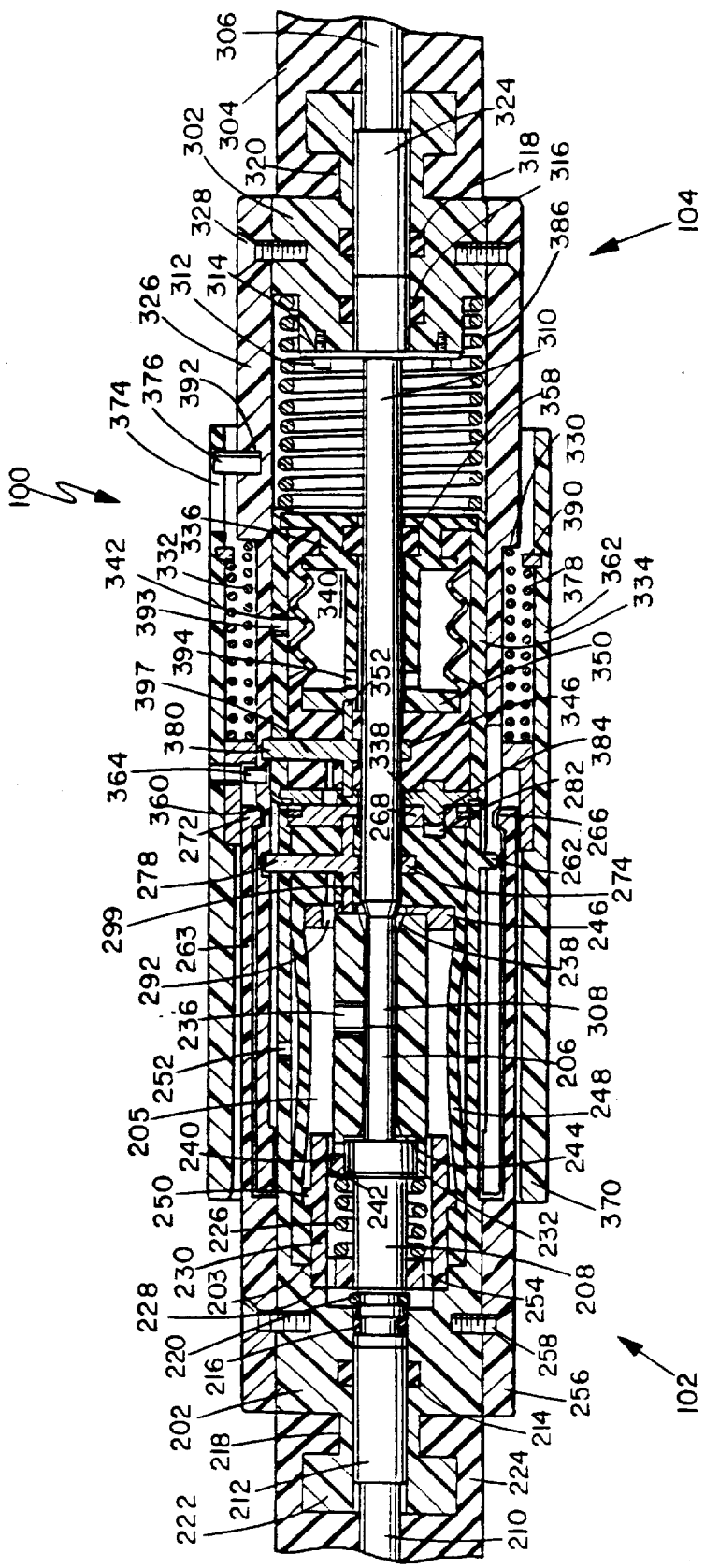
FIG. 1 is a cut-away view illustrating a first embodiment of the connector of the present invention, with the two connector units, i.e., the receptacle and plug units, mated to butt-join the ST optical terminals.

The connector of the present invention will now be described with reference to FIGS. 1–4. FIG. 1 illustrates the connector 100 having mated receptacle 102 and plug 104 units.

Referring now to FIGS. 2A and 2B, the receptacle unit 102 includes a cylindrical base 202 having shoulders 203, 207 with an axial through-bore 204 and a chamber 205 containing a liquid, such as an oil. The through-bore 204 sealably accommodates the passage of a sub-assembly including an ST optical (or electrical) terminal 206 and its mounting base 208, which are terminated to optical (or electrical) cable 210 via swage sleeve 212. Sealing of this sub-assembly to the through-bore is accomplished by gland-seal 214 and O-ring 216. A joint between mounting-base 208 and a ferrule 218 is a potential leak path from the interior of the cable 210, to which water could wick if a jacket surrounding the cable were punctured, into the connector, or in the other sense, into which the oil in the chamber 205 could leak. That joint is also sealed-off by O-ring 216. This sub-assembly can be made-up of components readily available commercially, which are normally intended, however, for dry use. The sub-assembly is constrained from passing through the terminal end of base 202 by a snap-ring 220.

The base 202 has an elongated extension comprising a larger diameter portion 222 that sealably retains a strain-relief unit 224. The strain relief unit 224 also constrictively seals to the jacket surrounding the cable 210, prohibiting the passage of water along the cable jacket and into the termination area of the connector unit. At the end of the base 202 opposite portion 222, an end cap 268 is secured to the base 202. The end-cap 268 is secured to the base 202 via a snap ring 298. A spring 226 is captured between a shoulder 228 of spring retainer 230 and another shoulder 232 on mounting base 208. Reacting against the shoulder 228, the spring 226 keeps the optical sub-assembly biased outward in retainer 230. Another ferrule (or passage) 234 provides mating alignment between the ST optical terminal 206 and its counterpart on the plug 104. A vent 236 allows passage of the oil of the chamber 205 into and out of a mating guide 238.

A ferrule key 240 of the sub-assembly engages a ferrule keyway 242 of ferrule 234 to insure that the ferrule 234 and ST optical terminal 206 remain rotationally fixed. This is an advantage in striving for repeatable optical-loss values from mating to mating. As will be seen in the course of the description, a mechanism is also provided to insure that the mating plug probe always lands in the receptacle 102 with the same rotational position. The ferrule 234 is captured axially between another shoulder 244 of the sub-assembly and a spacer 246 having a passage 292.

The oil chamber 205 may include a flexible wall 248 and is sealably retained to the spring retainer 230 by a circular nib 250. Additional vents 252 allow free communication with the outside environment, thus permitting volume and pressure compensation of the interior of the chamber 205. At least one (but preferably two or more) passages 254 allow this ventilation to extend to the portion of the chamber containing the snap ring 220. When connection is made to the plug 104, the optical sub-assembly is forced backward against the spring 226, and as the spring retainer 230 is constrained from moving backward by shoulder 228, a gap 106 (shown in FIG. 3) appears between the snap-ring 220 and the spring retainer 230. The fact that the optical sub-assembly may move axially against the spring 226 insures that the mating faces of the optical elements, in this case ST terminals, will never be subjected to excessive compressive forces.

An exterior shell (preferably cylindrical) 256 is attached to the base 202 via at least one mounting screw 258. The shell 256 serves to protect two keys (or tabs) 278 and 262, whose functions will be described later, from undesired movement and harm. The exterior shell 256 also incorporates at least one collet-type latch tine 263 comprising slots 264 and inward projections 266. The slots 254 allow the shell 256 to expand or contract in response to radial forces. As will be described below, the tines 263 spring outward as a cylindrical mating surface of the plug 104 enters the passage defined by the inward projections 266.

The entire receptacle unit 102 is assembled with mechanical seals, allowing it to be installed in the field without special primers or other process type seals that must be affected in closely controlled conditions.

In accordance with the present invention, the plug unit 104 is illustrated in FIGS. 3A and 3B. The plug unit 104 includes a base portion 302 which sealably engages a strain relief 304, which in turn seals to the exterior jacket of a cable 306, as similarly described for the receptacle unit 102. As with the receptacle unit 102, the plug unit 104 includes an optical sub-assembly having a terminal mating portion 308 and an elongated probe portion 310. The plug optical sub-assembly is fixed to the base 302 by at least one screw 312 acting with a flange 314. The sub-assembly is sealed to the base 302 via at least one gland seal, such as those indicated by reference numerals 316 and 318. As in the receptacle unit 102, in the plug unit 104 the junction between a swage sleeve 320 and a portion 322 of the assembly should be sealed. This may be accomplished through the combined seals of 324 and 316.

A tubular shell 326 is fixed to the base 302 of the plug unit 104 by at least one screw 328. The shell 326 contains a fluid-filled assembly which is free to slide axially along the elongated probe 310. The shell 326 travels axially with respect to an outer sleeve 370. The shell 326 is biased in its axial travel by a shoulder 330 on the outer surface of the shell and by a spring 332. The spring 332 keeps the shell 326 biased outward against a pin 376 in both the unmated condition, as shown in FIG. 3, and the mated condition, as shown in FIG. 1.

The fluid-filled assembly in the plug unit 104 includes an exterior shell 334 which affixes on one end to the large diameter portion of a seal base 336, and on the other end to a plug end-cap 338 having an end-cap bleed hole 339. Interior to the cylindrical space defined by the shell 334 and its end components 336 and 338, there is contained a chamber 340 with a flexible wall 342, vents 393, 394, and a nib 344 by which the chamber 340 sealably engages to a receiving seat in the seal base 336. The chamber 340 has an end portion 345 that incorporates a gate mechanism 346 and an axial passage 348 which is closed by the gate 346. The chamber 340 is sealed-off from passage 348 by a seal 358 engaging the probe 310. When assembled, the chamber 340 encloses the connecting portion of the optical sub-assembly. These elements are axially retained by the end-seal assembly including the chamber end-wall portion 345 and the gate 346. When assembled, the end-wall portion 345 of the chamber 340 is compressed between the end cap 338 and a shoulder 350 on the seal base 336. This compressive action seals the interfaces between the gate 346 and the surfaces of its seat within the end portion 345 of the chamber 340. As will be described below, the gate 346 rotates within its seat, the rotation occurring about a gate axle 352, 396 that protrudes axially from either side of the gate and is seated in a gate axle retainer socket 395. The axle portion 352 is sealed within the end-wall portion 345 by constriction of the material of the end-wall portion against the surfaces of the axle. The axle 352, 396 has a seat 354 in the end-cap 338 which, along with an inner plug tab 356, rotationally aligns the gate 346 to the end-seal assembly. The chamber 340 is sealed to the elongated probe 310 by way of a gland seal 358 seated in the seal base 336.

The outer surface of the shell 326 has a detent 360 that receives the inward projections 266 of the receptacle shell latch tines 263 when the receptacle unit 102 and plug unit 104 are engaged. The latch is locked from inadvertently opening by a locking sleeve 362 that slides axially on the plug shell 326. The forward travel of the locking sleeve 362 is restricted by a pin 364, which is installed during assembly through assembly holes 366 and 368. At the same time during assembly, the spring 332 is installed. The purpose of the spring 332, and the shoulder 330 against which the spring 332 reacts, is to keep the locking sleeve 362 biased forcefully forward.

The action of the latching mechanism can now be understood and will be explained. Demating cannot occur unless, and until, the locking sleeve 362 is retracted against the spring 332. This sort of latching mechanism is well known and would work well without the addition of an outer sleeve 370. But the outer sleeve 370 allows a flexibility of use that is an advantage, especially for subsea work where the mating and demating action may have to be accomplished by remotely controlled manipulators. In considering the mating of the units without the outer sleeve 370, it will be understood that the plug unit 104 must be gripped at one point for mating, and at another point for demating. That is, for demating, the locking sleeve 362 would have to be gripped and pulled axially away from the receptacle to unlock the inward projections 266 from the detent 360. But the locking sleeve 362 could not be gripped for mating. Urging it forward, in the action required for pushing the connector units together, would not allow the locking sleeve to move aside to permit the inward projections 266 to arrive at the detent 360. One would have to grip the plug outer exterior shell 326 for mating, and the locking sleeve 362 for demating. This is a distinct disadvantage.

The addition of the outer grip sleeve 370 alleviates this problem. The outer grip sleeve 370 has a shoulder 372 on its inner diameter, which shoulder engages the outer portion of the face of the locking sleeve 362. Clearly, when the outer grip sleeve 370 is pulled away from the mated receptacle and plug units, it retracts the locking sleeve 362 and permits the inward projections 266 to escape from the detent 360. The action is in the desired direction. When mating the connector, the grip is on the same surface of the outer sleeve 370 as for demating. Again, as the plug and receptacle units are mated, a ramp 270 on each of the inward receptacle shell projections 266 encounters the plug exterior shell 326. Further advancement of the ramps 270 along the exterior shell 326 spreads the tines 263 of the receptacle exterior shell 256 and allows the plug exterior shell 326 to enter the receptacle exterior shell 256.

When the receptacle and plug units are engaged to a certain point, the faces 272 of the receptacle shell tines 263 strike the face of the locking sleeve 362. Further engagement will cause the entire plug unit to move The plug unit, however, moves only until the rear extent of slot 374 encounters pin 376, which is seated in a key seat 392. At that point, locking sleeve 362 moves backwards relative to both the plug exterior shell 326 and the grip outer sleeve 370.

Additional engagement of the connector elements forces the locking sleeve 362 further backwards against the spring 332. When the engagement is complete, the inward projections 266 drop into the detent 360. As the outer diameter of the tines 263 drops below the inner diameter of the locking sleeve 362, the locking sleeve shoots forward due to the force of the spring 332, capturing the inward projections 266 in the detent 360, and mating is complete. Another spring 378 having a retainer ring 390 keeps the grip outer sleeve 370 from rattling when not in use.

The pin 376 acting in the slot 374 serves to limit the relative axial motion of the exterior shell 326 and the grip outer sleeve 370. It also serves to maintain the exterior shell 326 and outer sleeve 370 rotationally aligned, so that rotational forces applied to the outer sleeve 370 will be transmitted to the plug exterior shell 326.

Figure 4:
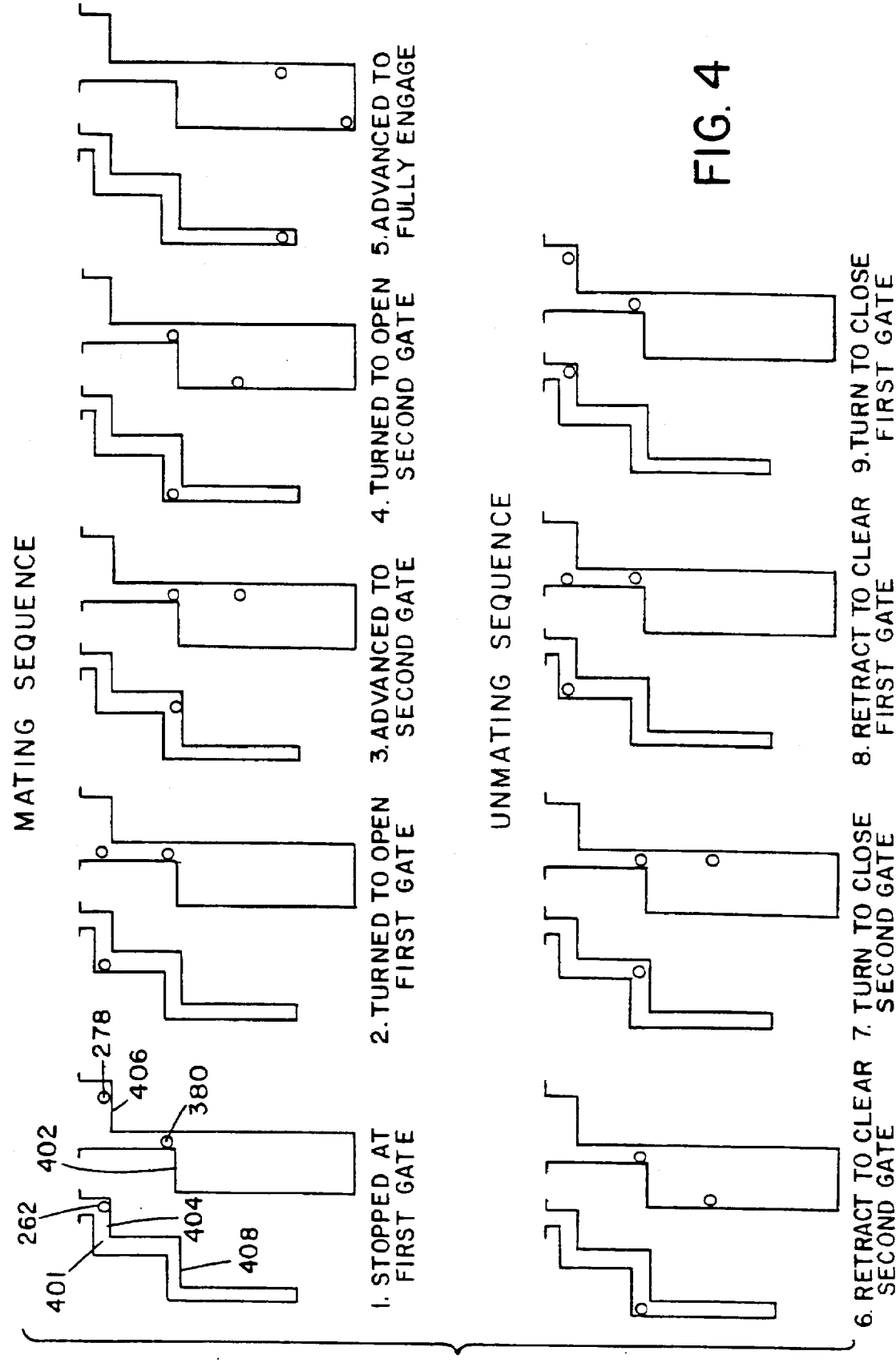
FIG. 4 illustrates the mating/demating sequence of the first embodiment of the connector of the present invention.

As described above, the gate 346 in the plug 104 and a gate 274 in the receptacle 102 must open at approximately the proper points in the mating/demating sequence in order to minimize fluid loss and contamination of the fluid chambers. Referring now to FIG. 4, the gates 274, 346 are opened and closed by rotating a receptacle gate actuator tab 278 and a plug gate actuator tab 380, respectively. The rotation is controlled by two keyways 401, 402 on the plug exterior shell acting together with a fixed key 280 on the receptacle 102 and the gate actuator tabs 278 and 380 on the receptacle 102 and plug 104, respectively.

With reference to FIGS. 2-5, the mating sequence will now be described. As mating of the receptacle and plug units begins, the mating faces of the units are brought together. The tines 263 in the receptacle shell 256 open as ramps 270 slide up over the plug exterior shell 326, and as engagement proceeds, a plug keyslot 401 (shown in FIGS. and 3A and 4) in the plug exterior shell 326 engages the fixed key 280 on the receptacle shell 256. At this point, a plug actuator keyway 402 (shown in FIGS. 3A and 4) is already engaged to the plug actuator tab 380. Shortly thereafter, as engagement proceeds, a plug end-cap key 384 engages a receptacle endcap keyhole 282. The engagement of the key 384 and keyhole 282 prevents the chamber assembly of the plug 104 from turning with respect to the receptacle 102, even if there is some relative rotation of the plug exterior shell 326 itself.

The plug keyslot 401 is irregular in shape and acts as a cam follower for fixed key 262, requiring a prescribed sequence of rotations between the plug and receptacle shells depending on engagement depth. An example of the sequence is as follows. As penetration progresses to the point where the plug chamber assembly has been pushed inward against a probe spring 386 so that the tip of the elongated probe 310 is sealably engaged in the axial passage 348 and is just at the gate 346, a first jog 404 (illustrated in FIG. 4) in the plug keyslot 401 and a jog 406 in the plug actuator keyway 402 require that the plug shell 326 rotate with respect to the receptacle shell 256 before further penetration can occur, as shown in Step 1 in FIG. 4.

Figure 5C:
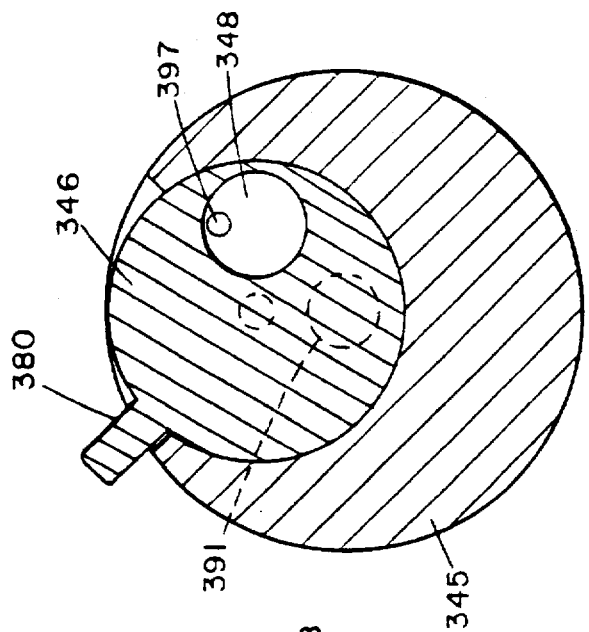
FIGS. 5A–5C illustrate a connector sealing mechanism used in the first embodiment of the connector.
Figure 5B:
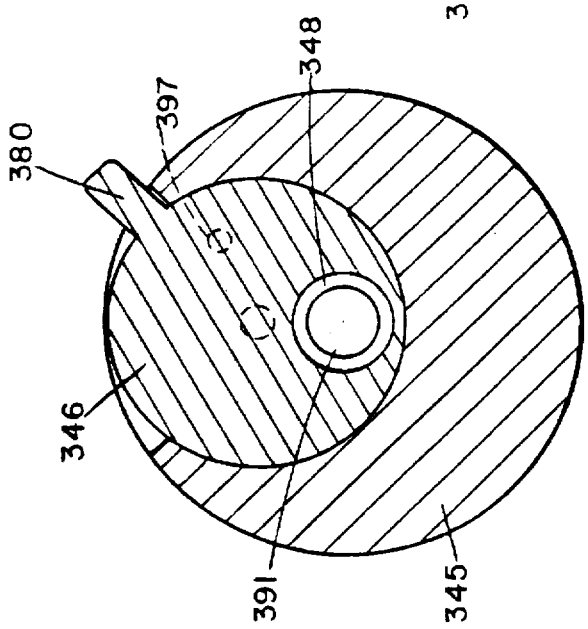
Figure 5A:
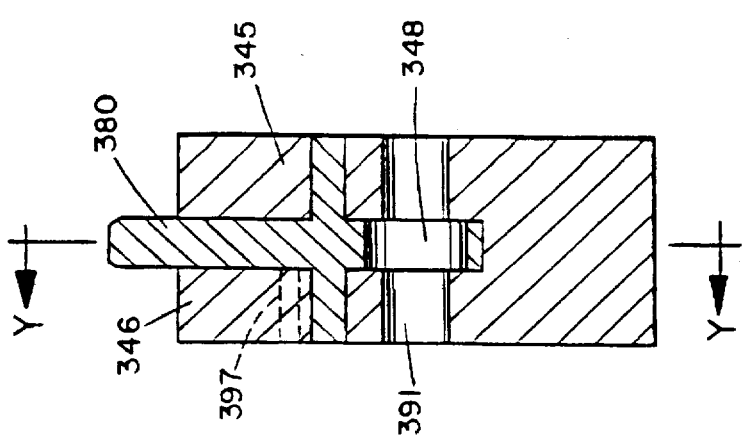

As the plug shell 326 is rotated to follow the first jog 404 of the keyslot 401 and the jog 406 in the actuator keyway 402, the rotation, via plug actuator keyway 402, also rotates the plug actuator tab 380, as illustrated in Step 2 of FIG. 4. Referring to FIG. 5C, this rotating action rotates a bore 349 of the plug gate 346 such that it is aligned with the axial bores or passages 348, 391 in the end of the chamber 345. Before the rotating action, a plug gate bleed hole 397 was aligned with the passage 348, as shown in FIG. 5B. FIG. 5A illustrates a cross-sectional view of the gate/seal shown in FIGS. 5B-5C.

The bleed hole 397 allows the bore 349 to be filled with water in the unmated position. As the gate 346 is opened through the rotation of the plug actuator tab 380 as shown in Step 2 of FIG. 4, this small water volume is also rotated so that it also aligns to the passages 348, 391. The water finds itself in the cavity formed by a plug entrance 388 and a receptacle entrance 284. The object of rotating fluid with the gate is to avoid creating voids that might lock-up the action under pressure and to avoid simultaneously any undesirable pumping action of fluid into or out of the chambers. The bore hole 391 is sealed on the chamber side by the elongated probe 310 in sealing relation with the walls of passage 348 and open on the other side to the environment. Rotating the plug shell and receptacle shell thus opens the plug gate 346, rotates a small volume of water into the plug gate 346, and clears the first jog 404 in the plug keyslot 401, as well as the jog 406 in the plug actuator keyway 402, allowing further penetration in the mating engagement.

The penetration continues until the elongated probe 310 has entered and sealably engaged an elastomeric bore 286 of the receptacle. Before the probe 310 enters bore 286, in the unmated condition, both bore 286 and bore 284 contain water. As the probe 310 moves through bore 349, bore 391, bore 284, and bore 286, the water contained in those bores is forced out of the receptacle/plug assembly, escaping along the border formed between the mating faces of the receptacle and plug. In addition, when the probe 310 enters each bore 348, 391, 286, 296, the probe 310 forms a fluid-tight seal between it and the walls of the bores. Accordingly, when fully mated, both the plug and receptacle have two fluid-tight seals, separated by the fluid bath formed by the larger diameter gate bore (i.e., bore 349), with which the probe 310 does not seal.

At this point, further penetration is again stopped by a second jog 408 in the plug keyslot 401, as shown in Step 3 of FIG. 4. A second rotation then occurs, as illustrated in Step 4 of FIG. 4. This time the entire chamber assembly of the plug rotates within the plug shell 326, and the receptacle actuator tab 260 of the receptacle gate assembly rotates on an axle and axle retainer seat 299, opening the receptacle gate 274 into the receptacle. The receptacle bore 296 communicates to the interior of the receptacle chamber 205 through gate 274 in the unmated state.

The receptacle gate assembly is similar to the plug gate assembly illustrated in FIGS. 5A–5C, with one exception: the receptacle bleed hole 294 opens to the interior chamber 205 of the receptacle via passage 292. Accordingly, rather than water being transmitted through the bleed hole, as in the plug, when in the unmated condition, the receptacle bleed hole 294 is aligned with and transmits oil from chamber 205 into the bore that lies in the receptacle gate 274.

When the receptacle gate 274 is rotated to the open position, then, the small volume of liquid (preferably oil) contained in the receptacle gate bore is rotated into alignment with the elastomeric bores 286, 296. As the plug probe 310 penetrates, being guided by the bore lead-in 290, the oil is forced into chamber 204, out through vent 236, and into chamber 205. The additional oil in chamber 205 can be accommodated due to the chamber's flexible bladder or wall 248. Once the second jog 408 in the plug keyslot 401 has been cleared, the receptacle and plug units may proceed to full engagement, as shown in Step 5 of FIG. 4, at which point the aforementioned latching mechanism engages, retaining the connector units in the mated position.

The mating sequence sounds complicated, but in practice is simple. It involves only a push-turn-push-turn-push sequence. The reverse of this sequence is followed for demating, as illustrated in Steps 6–9 of FIG. 4, and when the connector units disengage, they are fully returned to their original conditions and are ready for remating.

Figure 9:
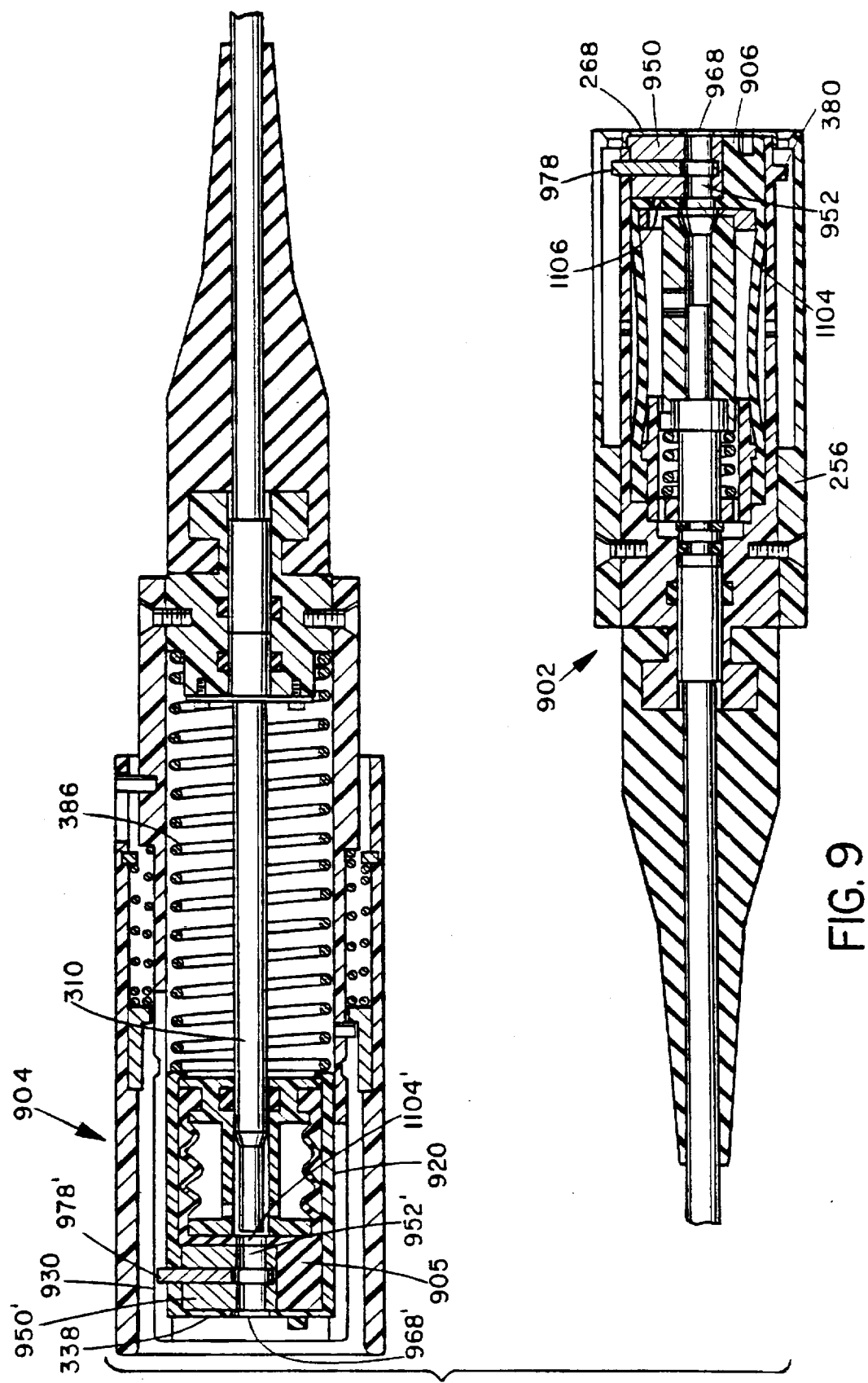
FIG. 9 is a cut-away view illustrating a second embodiment of the connector of the present invention, showing the plug and receptacle units in the unmated condition.

A second, and preferred, embodiment of the connector of the present invention is illustrated in FIGS. 9 through 12. In this second embodiment, the plug and receptacle gates open simultaneously, simplifying the push/turn mating sequence, and the connector traps a minimum amount of water in the mating faces of the plug and receptacle units during the mating process. The receptacle unit 902 and plug unit 904 of this second embodiment are illustrated in FIG. 9. As can be seen, those units are substantially similar to the units of the first embodiment. The plug unit 904 has an elongated probe 310, an end-cap 338, and a plug compensation bladder/seal assembly 905.

The receptacle unit 902 has an end-cap 268, a receptacle compensation bladder/seal assembly 906, and a receptacle shell 256.

Figure 10B:
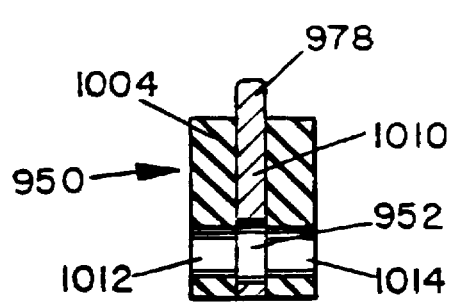
FIGS. 10A–10B illustrate axial and cross-sectional views, respectively, of a connector sealing mechanism used in the second embodiment of the connector of the present invention.
Figure 10A:
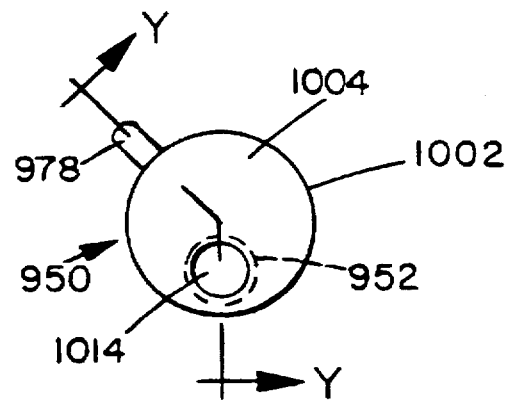

The construction of the connector sealing mechanism (or gate) of the second embodiment is illustrated in FIGS. 10A–10B. FIG. 10A illustrates an axial end view of a gate assembly 950. Although the following description references the receptacle gate assembly 950, the plug gate assembly 950' is substantially identical to the receptacle gate assembly 950. As can be seen, the gate assembly includes a substantially circular elastomeric body 1004, an actuator tab 978, and a bore hole 952 through which the elongated probe 310 penetrates when mating the receptacle 902 and plug 904 units. A cut-away view, FIG. 10B shows that the actuator tab 978 may actually be an extension above the elastomeric body 1004 of a gate skeleton 1010. The gate skeleton 1010 is formed from a hard material (such as metal or plastic), to which the elastomeric body 1004 is attached. Preferably, the elastomeric body 1004 will be molded around the gate skeleton 1010 such that the former bonds to the skeleton in the molding process. The gate skeleton 1010 and elastomeric body 1004 then become a unit, such that when the skeleton rotates, so does the elastomeric body. As shown in FIG. 10B, the construction of the gate assembly 1002 is such that the elastomeric overmold creates two end seals 1012, 1014 separated by the skeleton gate 1010.

Referring now to FIG. 11A, in the case of the receptacle unit 902, the gate assembly 950 loads into a seat 1102. As can be seen in FIG. 11A, the seat 1102 includes a bladder passage 1104 as well as a bleed hole 1106. FIG. 11B illustrates that, preferably, the seat 1102 is molded into the end of the receptacle compensation bladder/seal assembly 906. (The plug unit 904 may be similarly implemented with the plug compensation bladder/seal assembly 905.) With reference to FIG. 11C, the gate assembly 950 fits snugly into the seat 1102, causing a slight radial compression of the gate assembly and seat material at their interface. Referring back to FIG. 9, complete capture of the seat 1102 and the gate assembly 950 is provided by the receptacle shell 256, its (preferably thin) end-cap 268, and an internal spacer (not shown) that is spring loaded to press the gate assembly 950 outward against the end-cap 268.

Again with specific reference to the receptacle unit 902, rotating the gate assembly 950 within the seat 1102 opens and closes a passage 1104 through the seal and into a chamber 1112. Of course, the same principle holds with respect to the plug unit 904. As illustrated in FIGS. 11C–11E, the gate assembly 950 is seated within the seat 1102 in the compensation bladder/seal 906. FIG. 11D shows the gate/seal assembly in the "passage open" position, in which the gate bore hole 952 and the bladder passage 1104 are aligned. FIG. 11E shows that, when in the "passage closed" position, the gate bore hole 952 is connected to the inner chamber 1112 of the receptacle unit through the bleed hole 1106, but sealed from the outside environment by the thin end-cap 268 (not shown in FIG. 11). Thus, the bore hole 952 of the gate assembly 950 is filled with oil (or other liquid that is contained in the chamber) when in the closed position. The same is true of the end seal assembly of the plug unit 904. The holes 968, 968' in the receptacle end cap 268 and plug end cap 338, respectively, however, are filled with water in the unmated condition. Alternatively, because the gate assemblies 950, 950' are elastomeric, the gate assemblies could bulge through the end cap holes 968, 968', causing there to be little water in the end cap holes 968, 968' in the unmated condition.

Figure 12:
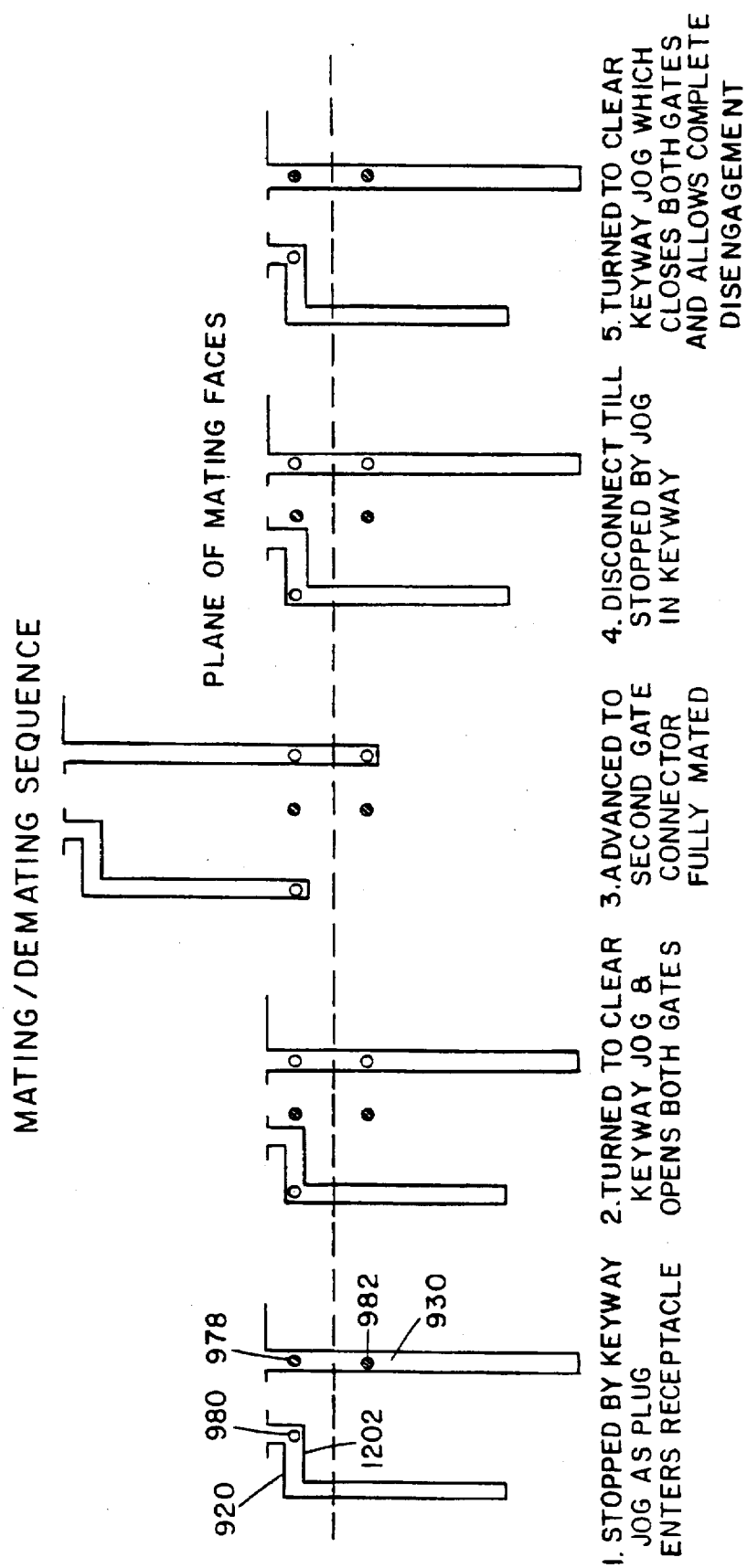
FIG. 12 illustrates the mating/demating sequence of the second embodiment of the connector of the present invention.

The mating/demating sequence of the second embodiment will now be described with reference to FIGS. 9 and 12. When the plug unit 904 and receptacle unit 902 begin the mating sequence, the mating faces of their end-caps 338, 268, respectively, are pressed and held together tightly by the internal spring 386 of the plug unit 904. This forces all but a thin film of water out from between the mating faces. At this point, a fixed receptacle key 380, as well as a receptacle actuator tab 978 and plug actuator tab 978', are within a plug keyslot 920 and a plug keyway 930. The plug and receptacle units are pushed together until the fixed receptacle key 980 engages a jog 1202 within the plug keyslot 920, as shown in FIG. 12.

Turning the plug and receptacle units with respect to one another allows the fixed receptacle key 980 to clear the jog 1202 in the plug keyslot 920 and rotates both the receptacle gate assembly 950 and the plug gate assembly 950'. This rotation places the gates into the "passage open" position, causing the oil filled bores 952, 952' of both the gates 950, 950' to rotate into alignment with the openings 968, 968' of the receptacle and plug end-caps 268, 338, respectively. Further forcing together of the plug and receptacle units then causes the plug probe 910 to sealably pass through the bores 952, 952', which are aligned with bladder passages 1104, 1104', into the receptacle mating socket, forming a fluid-tight seal, and thereby completing the connection. As can be seen in FIGS. 9 and 11C, the bores 952, 952' may have two narrower passages and one wide one, the latter defined by the skeleton gate 1010. Accordingly, the probe 910 may form two fluid-tight seals in each of the receptacle gate 950 and the plug gate 950; one for each of the two narrower portions of the bores 952, 952'. As with the first embodiment, the demating sequence is the reverse of the mating sequence and is also illustrated in FIG. 12.

As will be appreciated, the mating/demating sequence of the second, preferred embodiment is simpler than that for the first embodiment. Rather than a push-turn-push-turn-push sequence for mating in the first embodiment, the second embodiment requires only a push-turn-push sequence. In the first embodiment, each of the two turns opens one of the gates, requiring two jogs 404, 408 in the plug keyslot 401 and one jog 406 in the plug actuator keyway 402. In the second embodiment, in contrast, the single turn opens both gates, requiring only one jog 1202, that being in the plug keyslot 920.

FIGS. 6A–6G illustrate a rotating gate/seal that can accommodate multiple circuits. That is, as opposed to handling a single circuit, having only one conductive element and a single elongated probe, the gate/seal can handle multiple conductive elements and thus multiple elongated probes within the plug unit. The principles and parts underlying the multi-circuit gate/seal are similar to those for the single circuit embodiment described above, the plug and receptacle units being nearly identical. The plug, however, includes more than one elongated probe, and both the plug and receptacle have multiple passages, as well as multiple bore holes through the gate, to accept the multiple probes, as illustrated in FIGS. 6D–6G and described below.

Figure 6A:
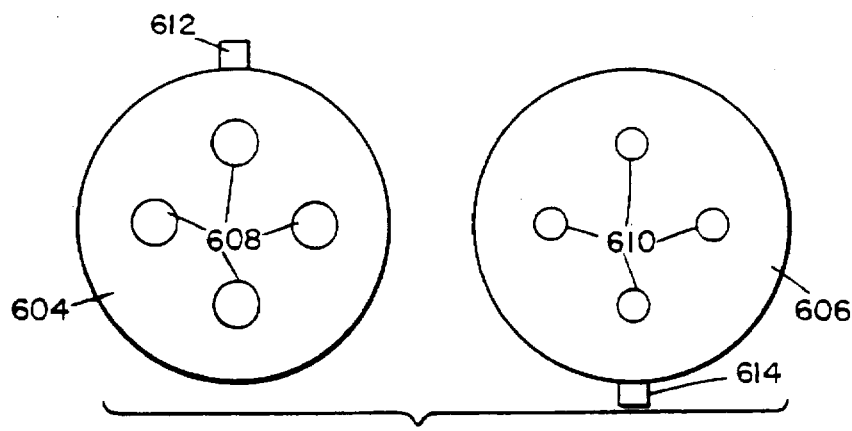
FIGS. 6A–6C are axial sectional drawings illustrating a rotating gate/seal embodiment that accommodates multiple circuits.
Figures 6B, 6C:
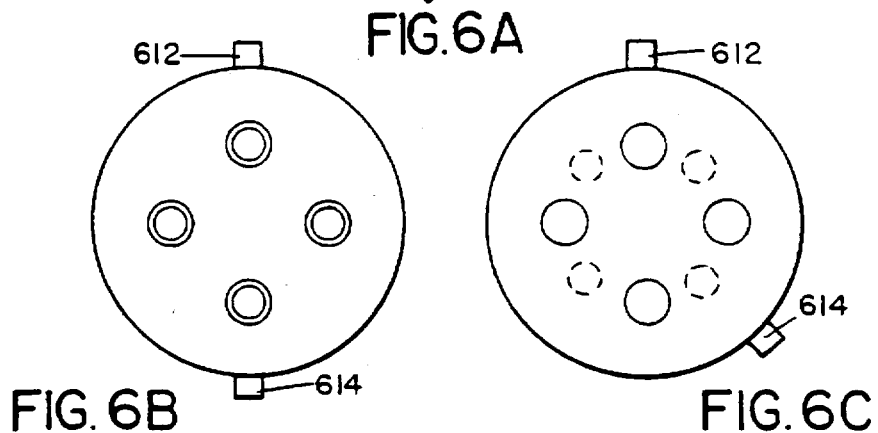

The multi-circuit gate/seal, then, operates like the single-circuit embodiment described above. Referring to FIG. 6A, the gate/seal includes a seal 604 and a gate 606, the seal 604 having bore holes 608, and the seal having passages 610. In the plug and receptacle units, the seal 604 and gate 606 are coupled together. Each may have an actuator tab 612, 614 used to effectuate rotating of the gate and/or seal. For example, as shown in FIG. 6B, the gate 604 is in an open position, with the bore holes 608 and the passages 610 aligned. This permits the elongated probes (see FIG. 6E and 6G) to pass through the gate/seal and into (for the receptacle) and out of (for the plug) the respective chamber. With reference to FIG. 6C, the gate 606 is in a closed position, which results from rotating either (or both) of the actuator tabs 612, 614, with the bore holes 608 and passages 610 opposed, thereby preventing passage of the elongated probes and sealing-off the chambers. As those skilled in the art will appreciate, the multi-circuit gate/seal can be implemented with any number of circuits.

With reference to FIGS. 6D–6G, the multiple circuit rotating gate/seal embodiment will be described as provided in plug 904' and receptacle 902' housings of a connector in accordance with the present invention. As shown in FIG. 6D, which illustrates an end view of the plug 904', seal 604 has four bore holes 608, each of which corresponds to a circuit, and actuator tab 614.

In FIG. 6D, the gate 606 and seal 604 are open so that the bore holes 608 are aligned with the passages 610. The outer sleeve 370 surrounds the plug 904', and a plug end-cap key 384 protrudes from the plug end-cap 338.

FIG. 6E is a cross section of the plug 904', illustrating that the plug has multiple probes 310, each of which corresponds to a circuit. The probes 308 extend through the bore holes 608 when the plug 904' and receptacle 902' are mated together.

The multi-circuit receptacle 902' is illustrated in FIGS. 6F and 6G. There, the receptacle 902' includes the gate 606 and seal 604, which are shown in the open position in FIG. 6F, thus having the bore holes 608 and passages 610 aligned. The receptacle 902' has channels 204 corresponding to each of the probes 308 in the plug 904', which channels 204 guide the probes 310 to engage the terminals 206 of the receptacle 902'. The receptacle has the exterior shell 256 surrounding the assembly. The actuator tab 614 on the gate 606 is used to bring the passages 610 into alignment with the bore holes 608 on the seal 604.

When the plug 904' is inserted into the receptacle 902', the plug gate 606 is rotated into position, and the probes 310 are passed through the passages 610 bore holes 608 in the gate 606 and seal 604 of the plug 904'. The gate 604 of the receptacle 902' is then rotated into open position, and the probes 310 pass through the passages 610 and bore holes 608 in the receptacle 902' gate and seal and into the channels 204. After the plug 904' and receptacle 902' are pushed together sufficiently, the probes 310 contact the terminals 206 at the end of channels 204, completing each of the four circuits. The mating and engagement sequence for the multi-circuit plug 904' and receptacle 902' is the same as described above for the single circuit embodiment, illustrated and described with respect to FIGS. 9–12. As above, the multi-circuit mating sequence involves only a push-turn-push sequence. The reverse is followed for demating.

For the single- and multi-circuit embodiments, any or all of the circuits may be electrical or optical. In the case of electrical circuits, the shafts of the probes 624, except for the tips are dielectric coated. Moreover, both the probes 310 and channels 204 are contained in their respective chambers in a liquid, preferably oil, throughout their lifetimes.

Figure 7A:
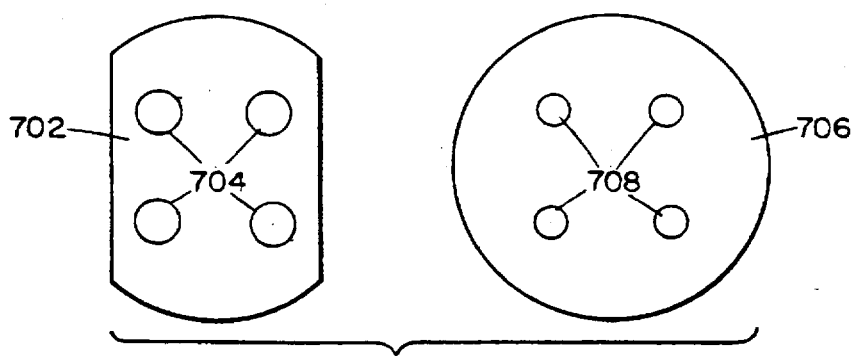
FIGS. 7A–7C are axial sectional drawings illustrating a sliding gate/seal embodiment that accommodates multiple circuits.
Figures 7B, 7C:
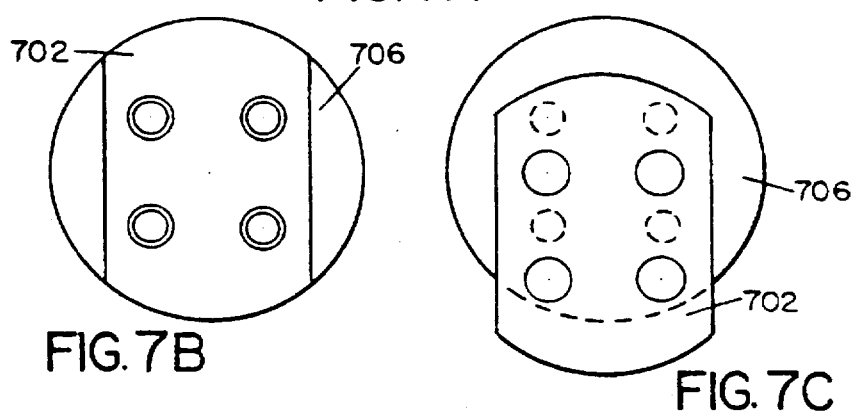

FIGS. 7A–7F illustrate another embodiment of the multi-circuit gate/seal of the present invention. Here, the multi-circuit gate/seal configuration is slidable; that is, the gate 702 is slidably moved so as to effectuate opening and closing of the chambers. The gate 702 has passages 704, and the seal 706 has bore holes 708. As shown in FIG. 7B, in the gate open position, the passages 704 and bore holes 708 are aligned, permitting the elongated probes (not shown) to pass-through the gate/seal assembly. FIG. 7C shows the gate closed position, in which the passages 704 and bore holes 708 are out-of-alignment, closing off the chamber.

Figure 7D:
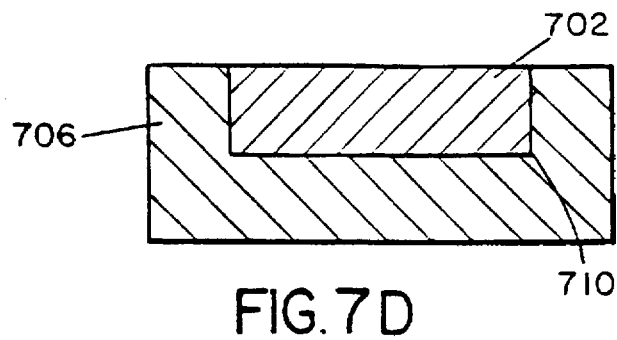
FIG. 7D is a top view of the sliding gate/seal embodiment illustrated in FIGS. 7A–7C.

FIG. 7D shows a top view of an embodiment of the sliding gate/seal configuration, illustrating the gate 702 and the seal 706. As illustrated, the gate 702 may reside in a slot 710 in the seal 706 so that the gate 702 slides while guided within the slot 710.

Figure 7E:
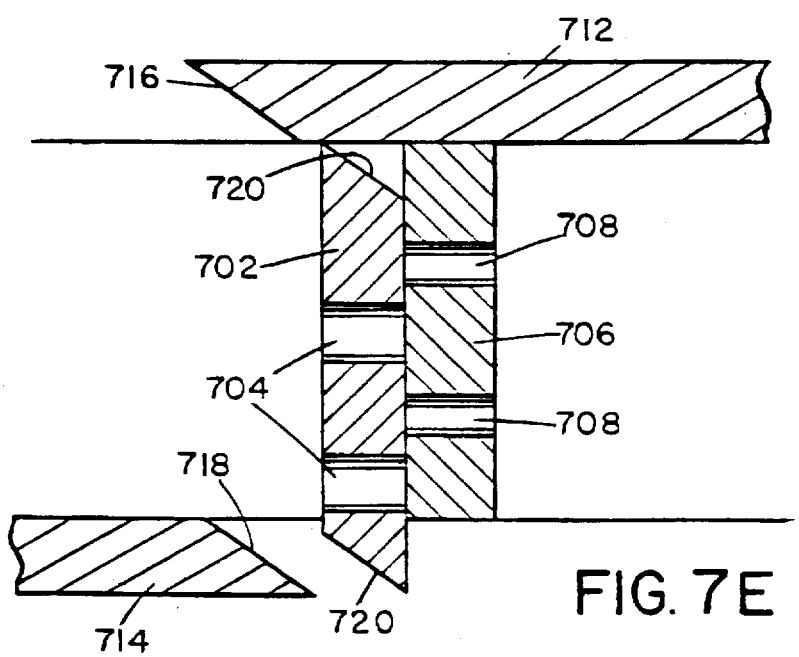
FIGS. 7E–7F are sectioned side views of the sliding gate/seal embodiment illustrated in FIGS. 7A–7D, showing the embodiment in the gate closed position (FIG. 7E) and the gate open position (FIG. 7F).
Figure 7F:
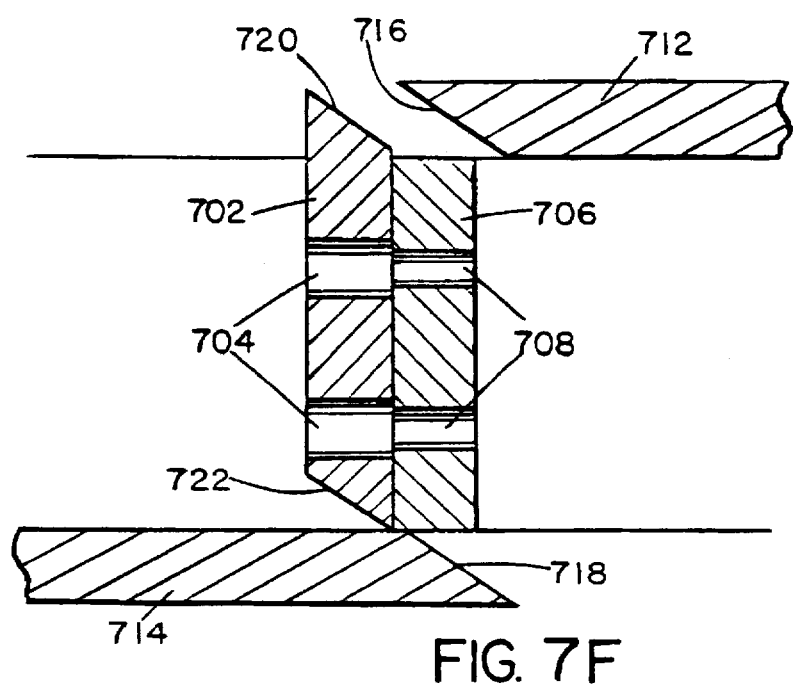

An exemplary embodiment for opening and closing the sliding gate seal embodiment is illustrated in FIGS. 7E–7F. Sliding actuators 712, 714 may be mounted on either side of the gate/seal arrangement of FIGS. 7A–7D. The sliding actuators 712, 714 may be moved back and forth in unison. The sliding actuators 712, 714 each have a ramp 716, 718, respectively, that works in concert with corresponding ramps 720, 722, respectively, on the gate 702 to shuttle the gate/seal arrangement between a fully open position, as illustrated in FIG. 7E, and a fully closed position, as illustrated in FIG. 7F.

As shown in FIG. 7E, to close the gate/seal arrangement, ramp 716 on sliding actuator 712 is moved toward ramp 720 on the gate 702. When actuator ramp 716 makes contact with gate ramp 720, the gate 702 begins sliding downward across the seal 706. When actuator ramp 716 has completed engagement with gate ramp 720, the gate/seal arrangement is fully closed, with passages 704 in the gate 702 being sealed against the wall of the seal 706 and thus out of alignment with the bore holes 708 in the seal 706.

FIG. 7F shows the closing process of the sliding gate/seal arrangement. This process is the complement of closing the sliding gate/seal arrangement. In the opening sequence, actuator ramp 718 engages gate ramp 722 until the gate 702 slides across the seal 704, bringing the passages 704 of the gate 702 into alignment with the bore holes 708 in the seal 706. Those skilled in the art will appreciate that the sliding gate/seal embodiment may be implemented with as many circuits as desired, from one, to several, to many.

Figure 8A:
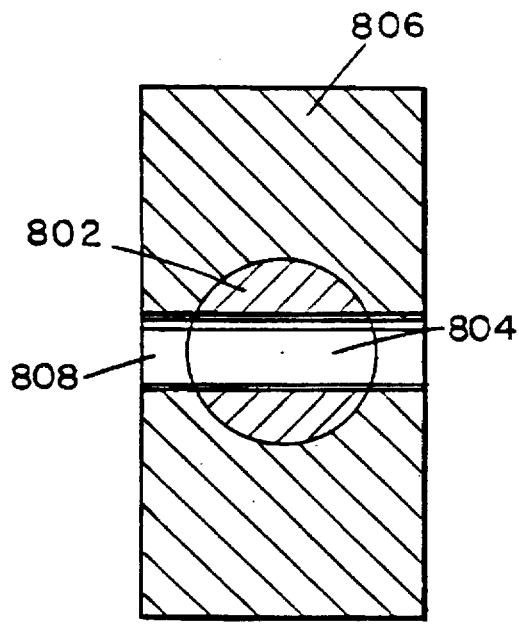
FIGS. 8A–8B are axial sectional drawings illustrating a rotating cylindrical gate/seal embodiment.
Figure 8B:
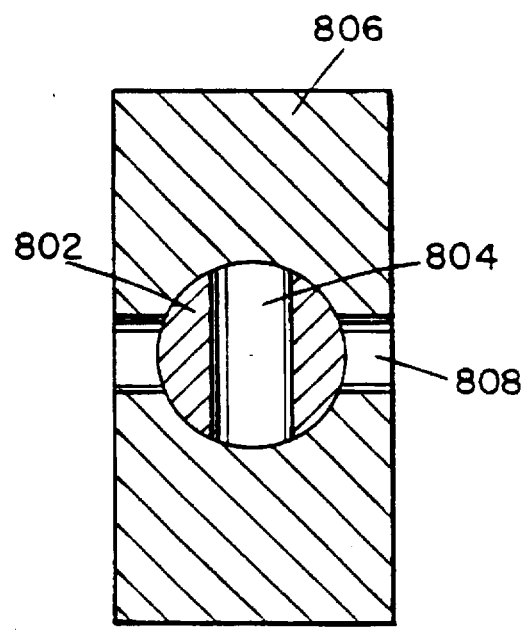

FIGS. 8A–8B illustrate a rotating cylindrical gate/seal embodiment. Here, the gate 802 is a cylindrical unit having a rectangular slit or hole 804 through it. The seal 806 may be rectangular in shape (as shown) or some other shape that can accommodate the gate 802, and the seal 806 also has a rectangular slit (or slot or passage) 808 formed in it. As shown in FIG. 8A, when the gate/seal is open, the rectangular slit 804 of the gate is aligned with the rectangular slot 808 of the seal. In FIG. 8B, this gate/seal arrangement is shown in the closed position, where the gate 802 is rotated with respect to the seal 806. Such a rotating gate/seal embodiment can be implemented in the plug unit 904' and receptacle unit 902' illustrated in FIGS. 6D–6G.

In the preferred embodiment of FIGS. 6–12, the present invention minimizes any contact of the probe(s) with the outside environment. The invention thus minimizes contamination, because only a very thin film of water remains between the plug and receptacle and probe mating faces when the two are brought together. When the opening (s) to the inside passages (or bores) 952, 952' of the receptacle and plug are rotated to the closed position, only a small amount of water lies in the end-cap openings 968, 968'. Moreover, the elastomer of the seal assemblies 950, 950' may protrude out of those openings 968, 968', thereby reducing the amount of water therein. Accordingly, when the gate seal assemblies are rotated to the open position, only a negligible amount of water will be trapped within the plug/receptacle interior, minimizing any contamination.

It will be apparent to those skilled in the art that various modifications and variations can be made in the apparatus and method of the present invention without departing form the spirit or scope of the invention. Thus, it is intended that the present invention cover the modifications and variations of this invention, provided they come within the scope of the appended claims and their equivalents.

What is claimed is:

1. A method for mating a plug unit to a receptacle unit, said plug unit having a plug keyway, a plug actuator tab, and a plug actuator keyslot, said receptacle unit having a receptacle key, and a receptacle actuator tab, said plug keyway having a first keyway jog and a second keyway jog, said plug actuator keyslot having an actuator jog, said method comprising:

first engaging said plug keyway with said receptacle key and said plug actuator keyslot with said receptacle actuator tab;

first pushing together said plug unit and said receptacle unit until said receptacle key engages said first keyway jog and said retab engages said tab engages said actuator jog;

first rotating said plug unit with respect to said receptacle unit thereby moving said plug actuator tab;

second pushing together said plug unit and said receptacle unit until said receptacle key engages said second jog;

second rotating said plug unit with respect to said receptacle unit thereby moving said receptacle actuator tab; and third pushing said plug unit and said receptacle unit together to mate said plug unit and said receptacle unit.

2. The method recited in claim 1 wherein the plug unit has a plug shell and a plug mating face, and the receptacle unit has a receptacle shell and a receptacle mating face, the method further comprising:

second engaging said plug mating face and said receptacle mating face and thereby leaving a thin film of water between said mating faces; and forcing said plug unit and said receptacle unit together such that said receptacle shell slides over said plug shell.

3. The method recited in claim 1 wherein the plug unit has a plug end-cap key and the receptacle unit has a receptacle end-cap keyhole, the method further comprising:

second engaging said plug end-cap key and said receptacle end-cap keyhole.

4. The method recited in claim 1 wherein the plug unit has a plug gate and a plug probe passage, said plug gate having a plug gate bore, an open position, and a closed position;

wherein the first rotating step includes aligning said plug gate bore and said plug probe passage such that said plug gate is moved from said closed position to said open position;

wherein the receptacle unit has a receptacle gate and a receptacle probe passage, said receptacle gate having a receptacle gate bore, an open position, and a closed position; and wherein said second rotating step includes aligning said receptacle gate bore and said receptacle probe passage such that said receptacle gate is moved from said closed position to said open position.

5. The method recited in claim 4 wherein the plug unit has a probe;

wherein the second pushing step includes moving said probe through the plug probe passage and the plug probe gate and thereby sealing said probe to the plug probe passage; and wherein the third pushing step includes moving said probe through the receptacle probe passage and the receptacle probe gate and thereby sealing said probe to the receptacle probe passage.

6. A method for mating a plug unit to a receptacle unit, said plug unit having a plug keyslot, a plug actuator tab, and a plug actuator keyway, said receptacle unit having a receptacle key, and a receptacle actuator tab, said plug keyslot having a keyslot jog, said method comprising:

first engaging said plug keyslot with said receptacle key and said plug actuator keyslot with said receptacle actuator tab and said plug actuator tab;

first pushing together said plug unit and said receptacle unit until said receptacle key engages said keyslot jog;

rotating said plug unit with respect to said receptacle unit thereby moving said plug actuator tab and said receptacle actuator tab;

second pushing said plug unit and said receptacle unit together to mate said plug unit and said receptacle unit.

7. The method recited in claim 6 wherein the plug unit has a plug shell and a plug mating face, and the receptacle unit has a receptacle shell and a receptacle mating face, the method further comprising:

second engaging said plug mating face and said receptacle mating face; and forcing said plug unit and said receptacle unit together such that said receptacle shell slides over said plug shell.

8. The method recited in claim 6 wherein the plug unit has a plug end-cap key and the receptacle unit has a receptacle end-cap keyhole, the method further comprising:

second engaging said plug end-cap key and said receptacle end-cap keyhole.

9. The method recited in claim 6 wherein the plug unit has a plug gate and a plug probe passage, said plug gate having a plug gate bore, an open position, and a closed position, and said receptacle unit has a receptacle gate and a receptacle probe passage, said receptacle gate having a receptacle gate bore, an open position, and a closed position; and wherein said rotating step includes the substeps of: aligning said plug gate bore and said plug probe passage such that said plug gate is moved from said closed position to said open position, and aligning said receptacle gate bore and said receptacle probe passage such that said receptacle gate is moved from said closed position to said open position.

10. The method recited in claim 9 wherein the plug unit has a probe; and wherein said second pushing step includes moving said probe through the plug probe passage, the plug gate bore, the receptacle probe passage, and the receptacle gate bore and thereby sealing said probe to the plug gate bore and the receptacle gate bore.

* * * * *

UNITED STATES PATENT AND TRADEMARK OFFICE
CERTIFICATE OF CORRECTION

PATENT NO. : 5,722,842
DATED : March 3, 1998
INVENTOR(S) : CAIRNS, JAMES L.

It is certified that error appears in the above-indentified patent and that said Letters Patent is hereby corrected as shown below:

- COLUMN 15, LINE 59: after "said" (first occurrence) delete "retab engages said" and insert in its place --receptacle actuator--.

Signed and Sealed this

Thirtieth Day of June, 1998

*Attest:*

BRUCE LEHMAN

*Attesting Officer*     *Commissioner of Patents and Trademarks*